April 27, 1948.   W. B. HOLDEN   2,440,272
DEHUMIDIFYING UNIT
Filed May 24, 1944   4 Sheets-Sheet 1

INVENTOR
WILLIAM B. HOLDEN.
BY
ATTORNEY

April 27, 1948.  W. B. HOLDEN  2,440,272
DEHUMIDIFYING UNIT
Filed May 24, 1944  4 Sheets-Sheet 2

INVENTOR
WILLIAM B. HOLDEN.
BY
ATTORNEY

April 27, 1948.  W. B. HOLDEN  2,440,272
DEHUMIDIFYING UNIT
Filed May 24, 1944  4 Sheets-Sheet 3

INVENTOR
WILLIAM B. HOLDEN.
BY
ATTORNEY

April 27, 1948.                    W. B. HOLDEN                         2,440,272
                                  DEHUMIDIFYING UNIT
                               Filed May 24, 1944            4 Sheets-Sheet 4
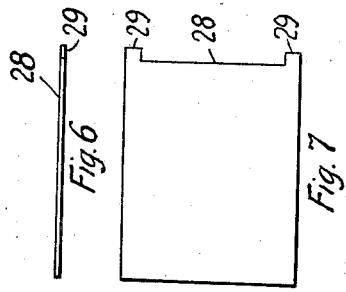
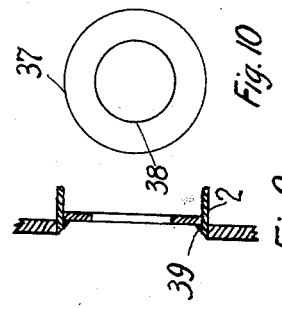
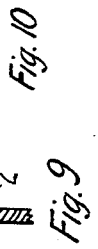
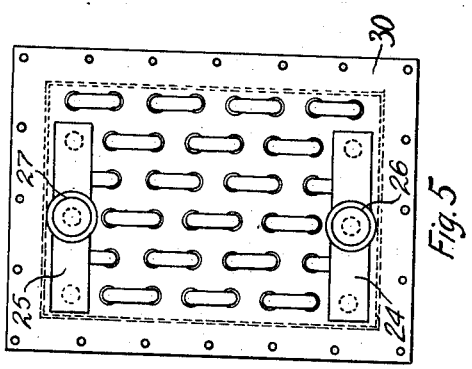
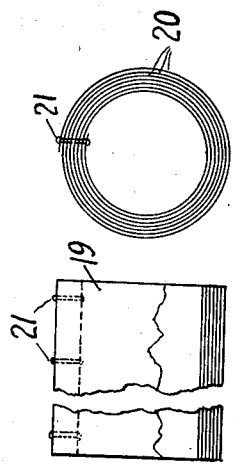
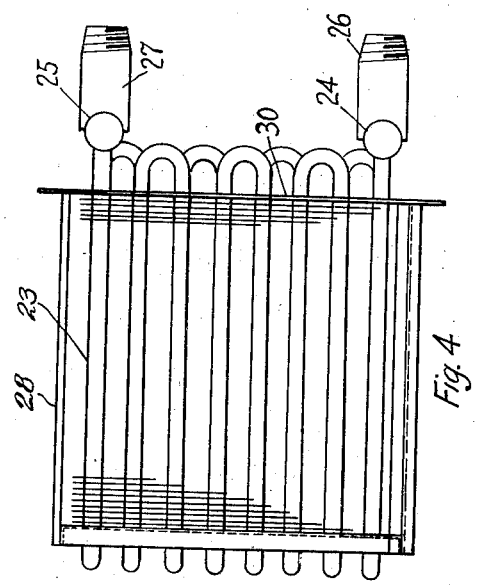
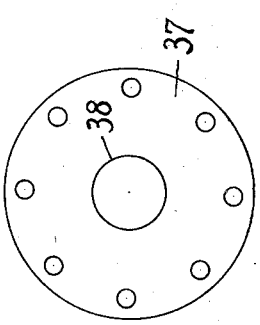
INVENTOR
WILLIAM B. HOLDEN.
BY
ATTORNEY

Patented Apr. 27, 1948

2,440,272

UNITED STATES PATENT OFFICE 2,440,272

DEHUMIDIFYING UNIT

William B. Holden, United States Navy

Application May 24, 1944, Serial No. 537,027

1 Claim. (Cl. 183—32)

(Granted under the act of March 3, 1883, as amended April 30, 1928; 370 O. G. 757)

This invention relates to means for maintaining lubricants, used in gear cases, engines and other machinery, in a serviceable condition indefinitely, by removing water and other foreign matter therefrom during operation.

More particularly, the device of this invention is adapted to remove water and other vapors from the gases flowing over the oil by condensation of the vapors from the gases, and includes filter means for the removal of any other foreign matter therefrom.

The object of this device is to provide a compact and efficient lubricating oil conditioner adaptable for mounting on the housing of any piece of machinery in which the lubricant is subjected to deterioration by dirt and water or water vapor.

Another object is to form an oil purifying unit having an inlet adaptable for connection to a vent or high point in a machine lubrication housing, an outlet adaptable for connection to said housing at a remote point from the vent, and a casing containing a filtering means, a cooler and an exhaust blower for causing a circulation of the vapors in the housing through the unit.

Another object is to provide a construction containing a filter, a cooler and a blower arranged in a casing having an inlet and outlet in such a manner that the fluid entering the casing will first be filtered to separate foreign matter therefrom and to collect any oil in suspension, then cooled to condense out any water or other vapors, and then exhausted through the outlet in a clean, cool and dry condition.

Other and more specific objects of this invention will appear as the description thereof proceeds, having reference to the accompanying drawings, wherein:

Figs. 4 and 5 are end and side views respectively of the cooler unit;

Figs. 6 and 7 are end and plan views of the baffle plate used in the cooler unit;

Fig. 8 shows one form of an inlet orifice plate;

Figs. 9 and 10 are two views of another form of inlet orifice plate;

Figs. 11 and 12 show the filter element;

The rusting, sludging and pitting troubles experienced are directly traceable to the presence of water in the lubricating oil. It was found that a large part of these troubles can be overcome if water is removed continually from the lubricating oil by means such as the present dehumidifier unit, which is more rapid and positive than that available in the form of a centrifugal lubricating oil purifier of limited capacity.

Figure 1:
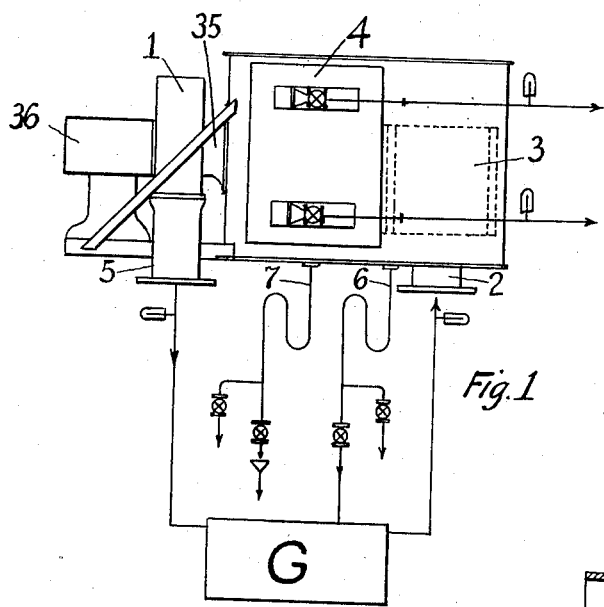
Fig. 1 is a diagrammatic view of the assembly of one form of the present invention.

Referring to Fig. 1 the dehumidifier unit consists of a portable ventilation blower 1 that draws the oil vapors by way of inlet 2 from the reduction gear casing G through an oil filter 3 and condenser 4 and exhausts back into the reduction gear casing by way of outlet 5. The oil that is filtered out in 3 goes back into the sump by way of the drain pipe 6 and the water that is condensed in 4 goes into the bilges by way of the drain pipe 7.

Figure 2:
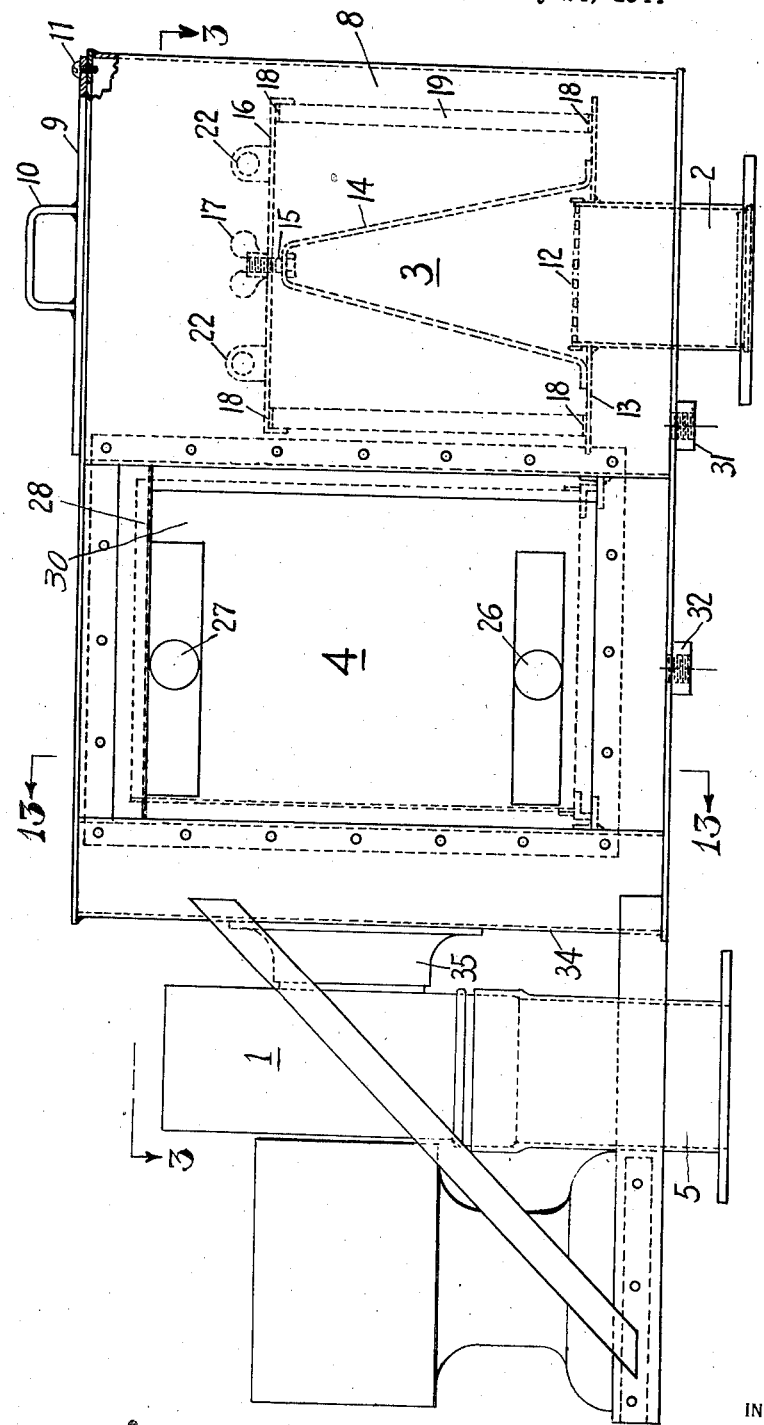
Fig. 2 is a side view of the device showing the general construction and arrangement of parts.
Figure 3:
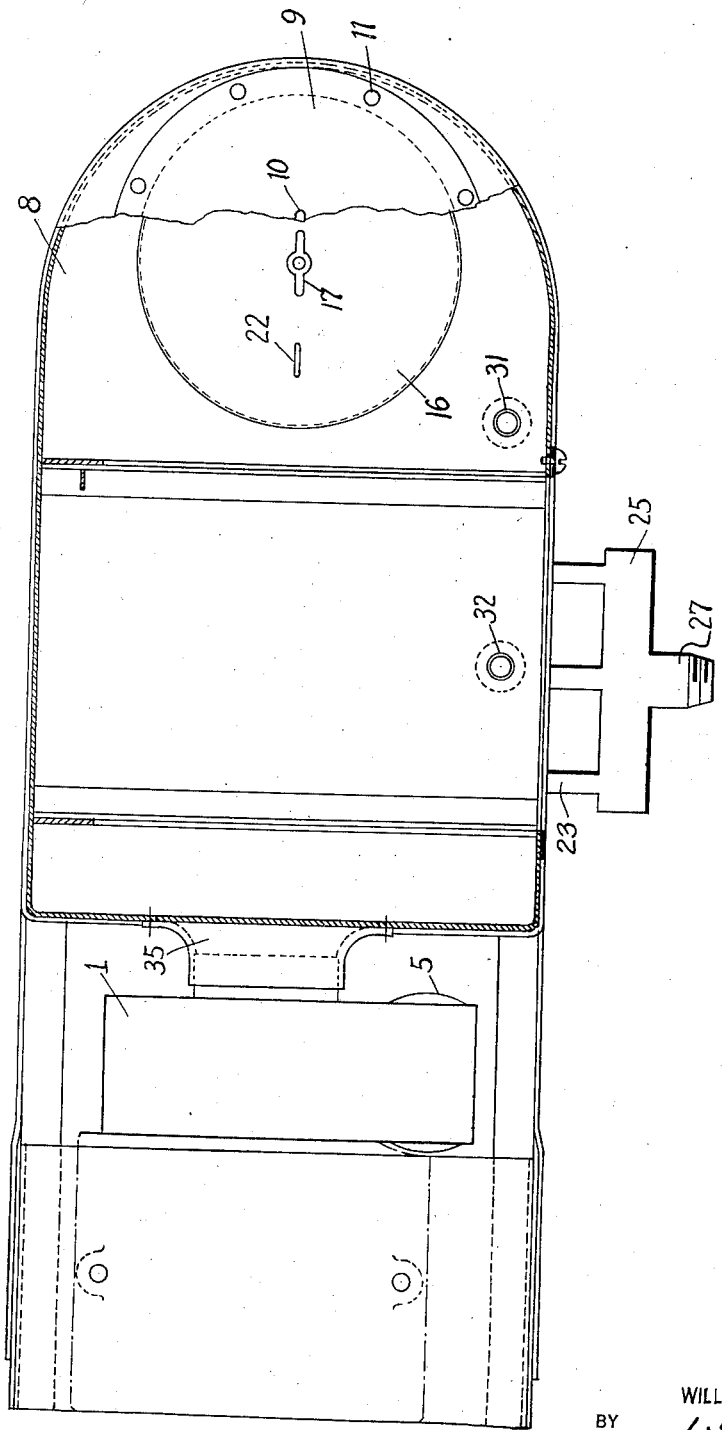
Fig. 3 is a plan view partly in section along the line 3—3 of Fig. 2.

Referring to Fig. 2, the oil filter 3 comprises the filter chamber 8, wherein the filter unit is housed, having a cover 9, with handle 10 and fastening screws 11. At the top of the fluid inlet 2 is a strainer 12. The filter unit is fitted over the top of the inlet and is formed by a base plate 13, having a central opening to fit over the inlet. A bracket 14 is attached to this plate and has a bolt 15 at the top for passing through the upper plate 16 to receive the thumb nut 17 for holding the filter unit together, gaskets 18 being provided at the top and bottom edges of the filter sleeve 19 which is composed of several turns 20 of sheet filtering material rolled into a sleeve as shown in more detail on a reduced scale in Figs. 11 and 12, and held together by rivets or bolts 21. The upper plate 16 has a pair of lugs 22 for lifting the filter unit out of the chamber for cleaning or renewal of the filter.

The cooler chamber 4 comprises the dehumidifier coil 23 shown in more detail in Figs. 4 and 5, and having inlet and outlet headers 24 and 25 with inlet and outlet connections 26 and 27 for the cooling medium which may be sea water or the condensate from the discharge of the main condenser pump in the case of use on the gear case in ships, or some other refrigerant. When used on shipboard, the outlet is connected to the main condenser. Baffle plate 28 fits over the top of the coil unit with its two ears 29 (see Figs. 6 and 7) around the side of coil plate 30, for guiding all of the air across the cooling coil unit.

An oil drain 31 in the bottom of the filter chamber connects with pipe 6 for return to the gear sump and a water drain 32 in the bottom of the cooler chamber connects with pipe 7 for return to the bilge sump.

Figure 14:
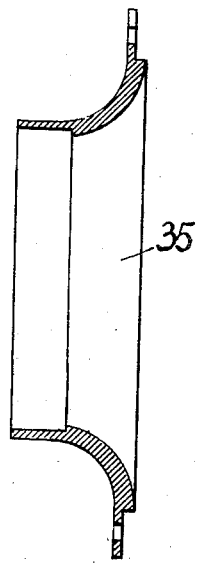
Fig. 14 is an enlarged view of the fitting forming the inlet passage into the blower from the cooler.
Figure 13:
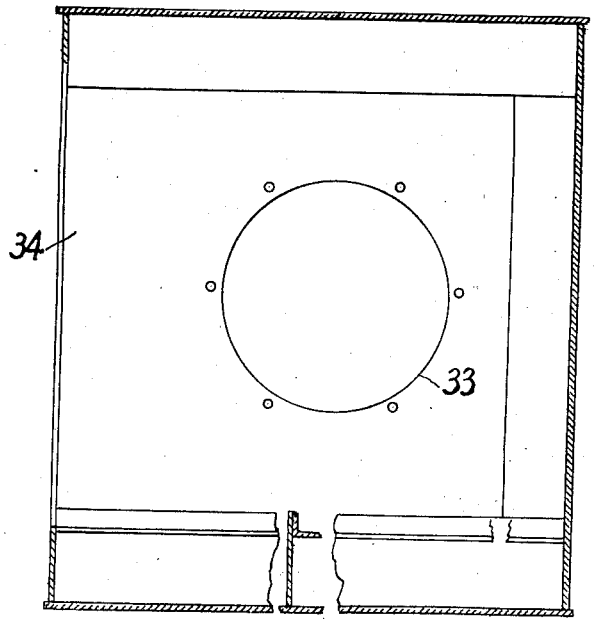
Fig. 13 is a sectional view along the line 13—13 of Fig. 2.

Fig. 13, being a section taken at 13—13 in Fig. 2 shows the supporting members around the sides and bottom for the cooling coil unit, so that the latter may be readily removed and installed. A round port 33 is shown in the end wall 34 of the housing for connection with the adaptor collar 35 shown in detail, slightly enlarged, in Fig. 14. This collar serves as an inlet to the blower 1. The blower may be of any well-known type and is mounted so as to take in the air from the adaptor collar 35 and exhaust it into the outlet 5. It may be driven by an electric motor 36, shown in outline in Figs. 1 and 2, or by any other available motive means.

The inlet opening may be varied to suit the installation by means of an orifice plate 37 with an orifice 38 of the proper size which is inserted at the inlet during installation of the unit. If the desired size of orifice is known before making the dehumidifier unit, the orifice plate may take the form 37, shown in Figs. 9 and 10, and be welded in place in the inlet opening as shown at 39. For any particular installation, the size of orifice best suited may be determined by tests, so as to accommodate the air velocities through the oil filter unit to the characteristics of the blower. For example, tests of the original unit built for one gear case indicated that excess air volume and velocity through the oil filter element carried over oil into the cooling unit. The introduction of a proper sized orifice corrected this condition. This orifice is an important feature in limiting the velocities through the filter so that all the oil vapor will be congealed and none will be carried over into the cooling unit.

Several dehumidifier units, as shown in Fig. 1 and described above, have been built and installed on various naval vessels and have been tested extensively. The results of these tests were highly gratifying in that substantial quantities of water were removed from the oil and the gears and oil were found to be in perfect condition.

The results of extensive tests of the dehumidifier unit in the laboratory showed that the unit is effective in the removal of water from emulsion in the bulk oil. The unit continued to remove water after a centrifugal purifier had ceased to yield water when the two were operated in parallel. The condensed water removed by the unit carried with it only a negligible amount of oil. The oil separated by the filter is suitable for reuse without treatment.

As a result of the various satisfactory tests of the subject dehumidifying unit on various naval vessels and in the laboratory the following advantages were found:

(1) The unit will remove water from the lubricating oil system.

(2) The unit will remove uncondensed steam which could not be removed by centrifuging.

(3) Water removal by the unit is much more positive and complete than is possible with the centrifuge.

(4) The unit will remove water from emulsion where it may be so finely defined that removal by centrifuging is impossible.

(5) The objection existing in some of the types of centrifuge that water may be thoroughly mixed into the oil in an extremely fine dispersion, does not exist in the dehumidifying unit.

Various changes in the form, arrangement and dimensions of the several parts of the present device may be made without departing from the spirit and scope of the present invention as defined in the appending claim.

The invention described herein may be manufactured and used by or for the Government of the United States of America for governmental purposes without the payment of any royalties thereon or therefor.

What is claimed is:

In combination with a closed gear casing, an apparatus for removing vapor and entrained oil droplets from the atmosphere of said casing that exists above the lubricant contained therein, said apparatus comprising three compartments connected in series, the first compartment containing a filter element and a drain for returning separated oil to the casing, the second compartment containing a vapor condensing means and a drain for removing condensed liquid, and the third compartment containing a blower, said first and third compartments further having inlet and outlet respectively connected to the gear casing at widely separated points.

WILLIAM B. HOLDEN.

REFERENCES CITED

The following references are of record in the file of this patent:

UNITED STATES PATENTS

| Number | Name | Date |
|---|---|---|
| 867,742 | Morison | Oct. 8, 1907 |
| 1,431,347 | Watson | Oct. 10, 1922 |
| 1,864,332 | Zubaty et al. | June 21, 1932 |
| 2,022,463 | Erschen et al. | Nov. 26, 1935 |
| 2,178,033 | Decker | Oct. 31, 1939 |
| 2,209,661 | Pickstone | July 30, 1940 |
| 2,325,647 | Adamson | Aug. 3, 1943 |
| 2,361,393 | Freeman | Oct. 31, 1944 |